(12) United States Patent
Sawanobori et al.

(10) Patent No.: US 11,815,786 B2
(45) Date of Patent: Nov. 14, 2023

(54) BLADE OPEN-CLOSE DEVICE AND ELECTRONIC DEVICE

(71) Applicant: Nidec Copal Corporation, Tokyo (JP)

(72) Inventors: Koji Sawanobori, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 32 days.

(21) Appl. No.: 17/477,531

(22) Filed: Sep. 17, 2021

(65) Prior Publication Data

US 2022/0091478 A1 Mar. 24, 2022

(30) Foreign Application Priority Data

Sep. 23, 2020 (JP) ................................ 2020-158799

(51) Int. Cl.
  *G03B 11/04* (2021.01)
  *G06F 1/16* (2006.01)

(52) U.S. Cl.
  CPC .......... *G03B 11/043* (2013.01); *G06F 1/1686* (2013.01); *G06F 1/1616* (2013.01); *G06F 1/1679* (2013.01)

(58) Field of Classification Search
  CPC ................................ G03B 11/043; H02K 21/14
  See application file for complete search history.

(56) References Cited

U.S. PATENT DOCUMENTS

| 2004/0239797 | A1  | 12/2004 | Masuda |
| 2007/0201866 | A1* | 8/2007  | Kihara ..................... G03B 9/18 396/468 |
| 2009/0295983 | A1  | 12/2009 | Sekimoto et al. |
| 2011/0129212 | A1* | 6/2011  | Yamaguchi ............. G03B 9/20 348/E5.037 |
| 2015/0109523 | A1* | 4/2015  | Tanaka ..................... G03B 9/42 348/367 |
| 2018/0352133 | A1  | 12/2018 | Yoneda et al. |

FOREIGN PATENT DOCUMENTS

| JP | H550438    | U  | 7/1993  |
| JP | 2004348051 | A  | 12/2004 |
| JP | 2009288327 | A  | 12/2009 |
| JP | 2012226242 | A  | 11/2012 |
| JP | 2017146484 | A  | 8/2017  |
| WO | 2017104265 | A1 | 6/2017  |

* cited by examiner

*Primary Examiner* — Noam Reisner
(74) *Attorney, Agent, or Firm* — Hauptman Ham, LLP

(57) ABSTRACT

A blade open-close device retains a blade at a predetermined position under an external load. A blade open-close device includes a base, a cover plate covering part of the base, a blade between the base and the cover plate, a driving actuator that moves the blade in X-direction, and a stopper actuator located adjacent to the driving actuator in X-direction to restrict an operation of the driving actuator. The driving actuator includes a rotor magnet rotatably located adjacent to a yoke and a driving lever including a connecting part connected to the blade. The stopper actuator includes a rotor magnet rotatably located adjacent to a yoke and a stopper lever including a restrictor movable onto a path of the driving lever in the driving actuator.

7 Claims, 8 Drawing Sheets

BLADE OPEN-CLOSE DEVICE AND ELECTRONIC DEVICE

RELATED APPLICATIONS

The present application claims priority to Japanese Application Number 2020-158799, filed Sep. 23, 2020, the disclosure of which is hereby incorporated by reference herein in its entirety.

BACKGROUND

Technical Field

The present invention relates to a blade open-close device and an electronic device, and particularly, to a blade open-close device for covering and uncovering an opening with a blade.

Description of the Background

Recent electronic devices, such as smartphones, smart speakers, and drones, incorporate cameras. Such a camera typically has a lens aperture constantly uncovered, or being constantly ready for image capturing. In this state, the camera may be operated by a malicious third party, possibly capturing images or videos unintended by the user. Such images or videos can be used for crime.

In particular, electronic devices incorporating cameras are now often connected to a network such as the Internet. The connected electronic devices may be operated remotely by a malicious program without being noticed by the user. When the electronic device is operated remotely, image capturing may be performed without being noticed by the user, possibly allowing the camera to capture images or videos for transmission to external devices. For privacy protection of the user, structures are awaited for shielding against image capturing with a camera as unintended by the user.

Such structures for shielding against image capturing with a camera may include a known camera shutter that opens and closes a blade between a lens and a subject (refer to, for example, Patent Literature 1). However, the blade may open unintentionally under an external load such as external vibration or impact. In this case, shielding cannot be achieved against image capturing with a camera.

CITATION LIST

Patent Literature

Patent Literature 1: Japanese Unexamined Patent Application Publication No. 2009-288327

BRIEF SUMMARY

In response to the above issue, one or more aspects of the present invention are directed to a blade open-close device that retains a blade at a predetermined position under an external load and to an electronic device including the blade open-close device.

A blade open-close device according to one aspect of the present invention retains a blade at a predetermined position under an external load. The blade open-close device includes a base having a housing space housing a lens unit, a cover plate covering at least part of the base, and a blade located between the base and the cover plate. The cover plate has an opening aligned with an optical axis of the lens unit. The blade open-close device includes a driving actuator that moves the blade in an opening and closing direction perpendicular to the optical axis between a closing position to cover the opening and an opening position to uncover the opening, and a stopper actuator located adjacent to the driving actuator in the opening and closing direction to restrict an operation of the driving actuator. The driving actuator includes a first yoke, a first coil wound around part of the first yoke, a first rotor magnet rotatably located adjacent to the first yoke, and a first lever including a connecting part connected to the blade. The first lever is rotatable with the first rotor magnet to move the blade. The stopper actuator includes a second yoke, a second coil wound around part of the second yoke, a second rotor magnet rotatably located adjacent to the second yoke, and a second lever rotatable with the second rotor magnet. The second lever includes a restrictor movable onto a path on which the first lever in the driving actuator is movable.

DETAILED DESCRIPTION

Figure 1:
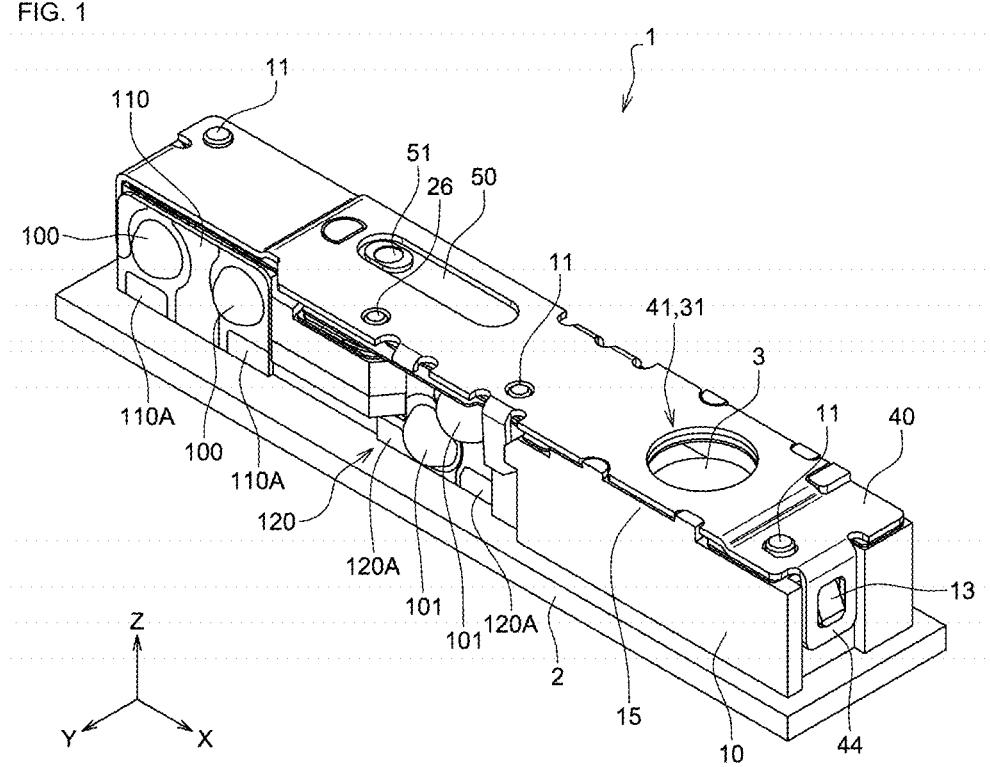
FIG. 1 is a perspective view of a blade open-close device according to one embodiment of the present invention, together with a module board and a lens unit.

A blade open-close device according to one or more embodiments of the present invention will now be described in detail with reference to FIGS. 1 to 10. In FIGS. 1 to 10, the same or corresponding components are given the same reference numerals, and will not be described repeatedly. In FIGS. 1 to 10, the scale and dimensions of each component may be exaggerated, or one or more components may not be shown. Unless otherwise specified, the terms such as first and second will be used simply to distinguish the components and will not represent a specific order or sequence.

Figure 2:
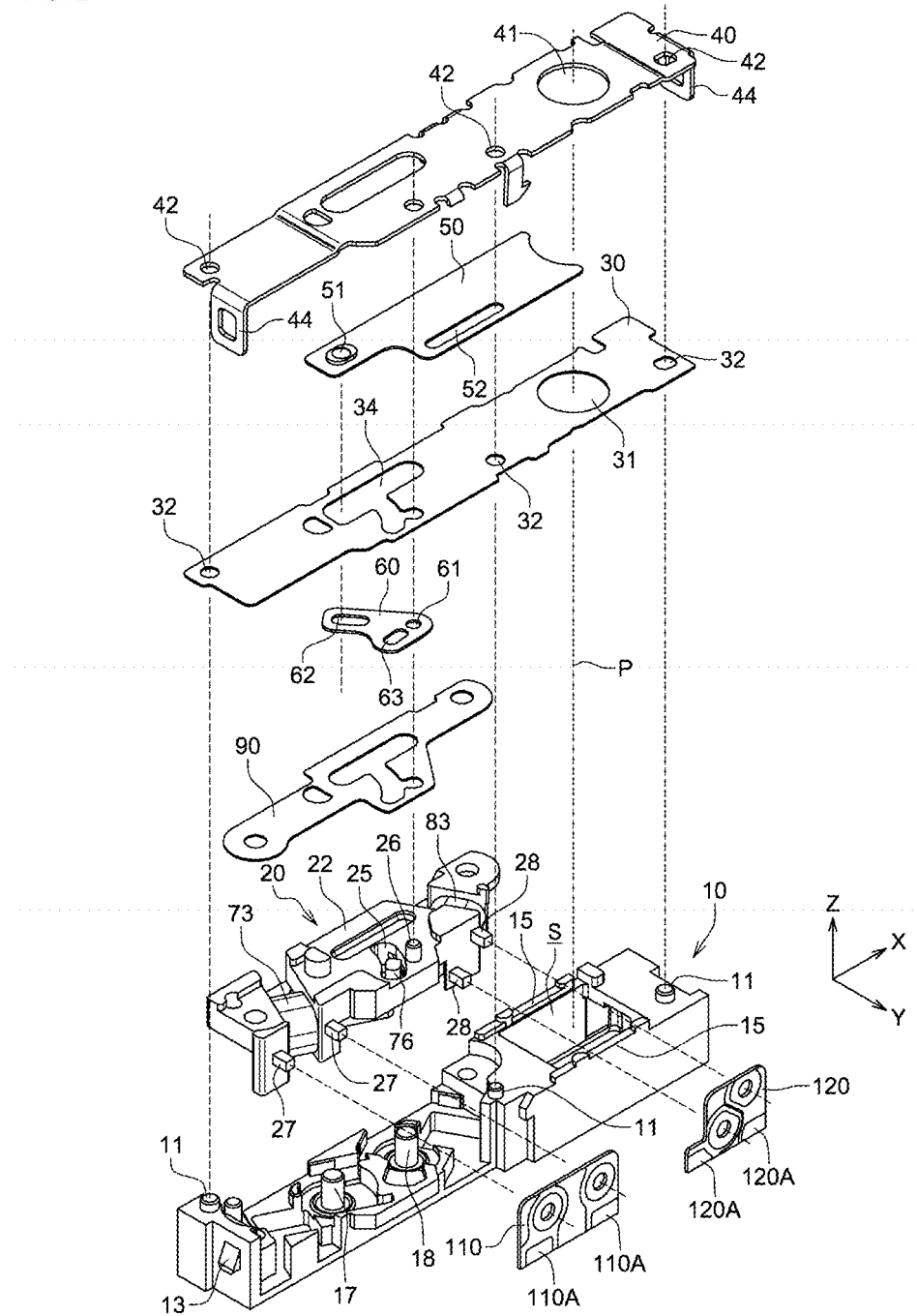
FIG. 2 is an exploded perspective view of the blade open-close device in FIG. 1.
Figure 3:
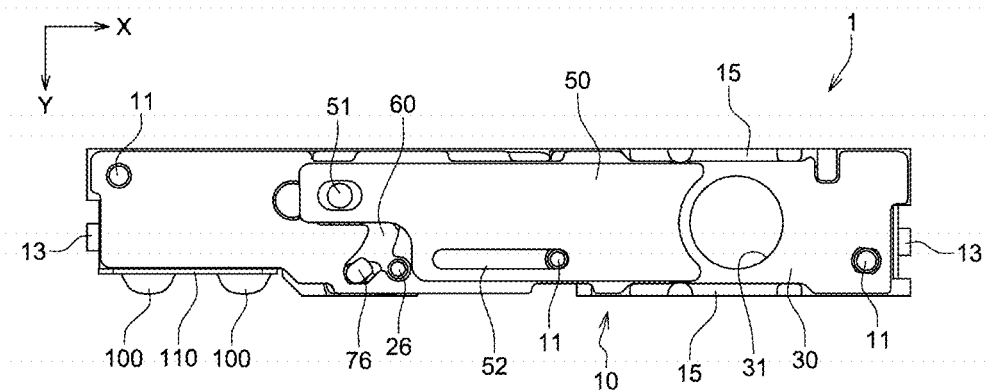
FIG. 3 is a plan view of the blade open-close device in FIG. 1 with a cover plate being removed.

FIG. 1 is a perspective view of a blade open-close device 1 according to one embodiment of the present invention. FIG. 2 is an exploded perspective view of the device. FIG. 3 is a plan view of the device with a cover plate being removed. The blade open-close device 1 according to the present embodiment is mounted, for example, on a camera module incorporated in an electronic device, and more specifically, on a module board 2 on which a lens unit 3 is mounted. For ease of explanation in the present embodiment, up or upward refers to the positive Z-direction in FIG. 1, and down or downward refers to the negative Z-direction.

As shown in FIGS. 1 to 3, the blade open-close device 1 includes a base 10 attached to the module board 2, an actuator unit 20 located on the base 10, a partition 30 located on the base 10, a cover plate 40 covering an upper portion of the base 10, a blade 50 located between the cover plate 40 and the partition 30, and a cam plate 60 connected to the blade 50. The base 10 has a substantially rectangular housing space S housing the lens unit 3 (refer to FIG. 1) mounted on the module board 2.

The partition 30 has an opening 31. The cover plate 40 has an opening 41. The openings 31 and 41 are aligned with an optical axis P of the lens unit 3. The opening 31 in the partition 30 functions as an opening (aperture) that determines the amount of light entering the lens unit 3. Thus, the partition 30 may be referred to as an aperture blade. The partition 30 may be eliminated. In this case, the opening 41 in the cover plate 40 functions as the aperture.

The cover plate 40 has multiple pin holes 42. With pins 11 located on the base 10 received in the pin holes 42, the cover plate 40 is attached to the base 10. The cover plate 40 includes hooks 44. With the hooks 44 engaged with engagement tabs 13 located on the base 10, the cover plate 40 is fastened to the base 10. Rather than with the illustrated components, the cover plate 40 may be fastened to the base 10 with, for example, screws.

The partition 30 is located in the positive Z-direction (upward) from the base 10. The partition 30 has pin holes 32 to receive the pins 11 on the base 10. The cam plate 60 is located in the negative Z-direction (downward) from the partition 30. A partition 90, which is attached to the actuator unit 20, is located in the negative Z-direction (downward) from the cam plate 60.

The blade 50 is located in the positive Z-direction (upward) from the partition 30. The base 10 includes guides 15 extending in the positive Z-direction from its two edges in Y-direction. The blade 50 is located between the guides 15. The blade 50 is thus movable, in a blade chamber between the partition 30 and the cover plate 40, in X-direction (open-close direction), while being guided by the guides 15 on the base 10.

Figure 4:
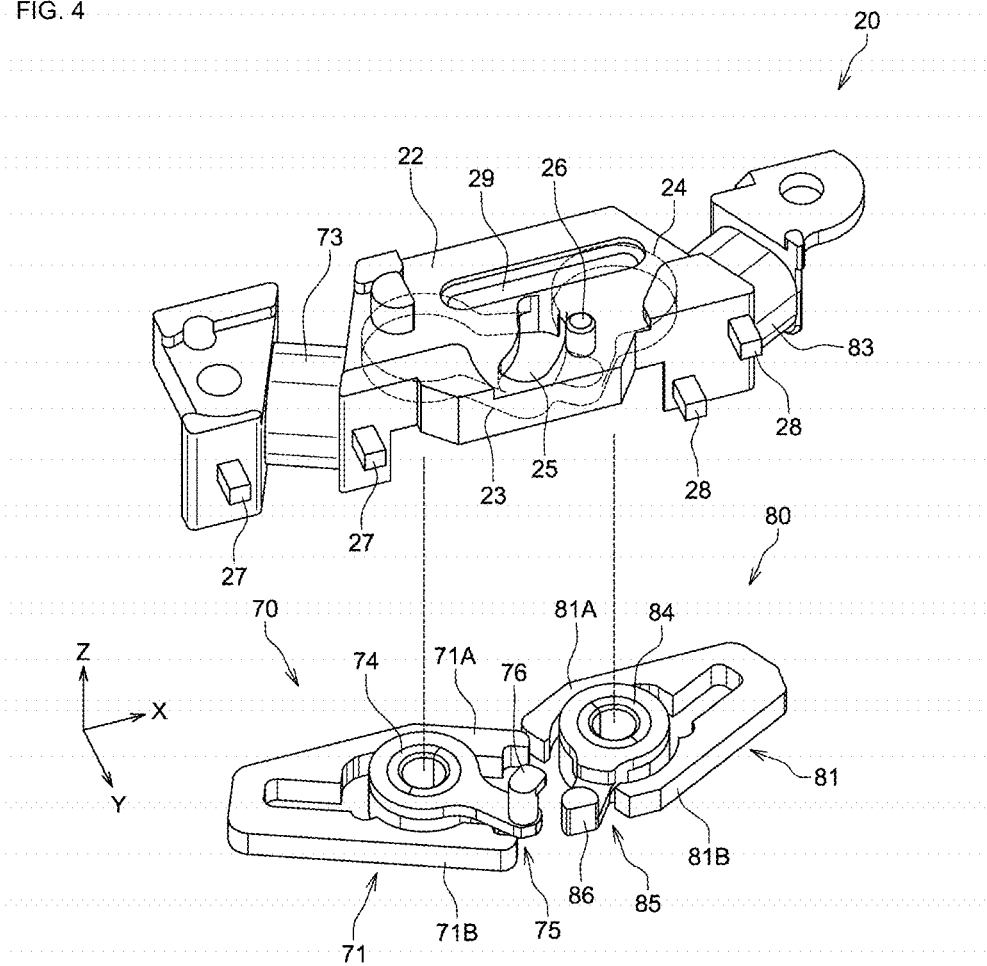
FIG. 4 is an exploded perspective view of an actuator unit included in the blade open-close device in FIG. 1.

FIG. 4 is an exploded perspective view of the actuator unit 20. As shown in FIG. 4, the actuator unit 20 includes a driving actuator 70 that moves the blade 50, a stopper actuator 80 that restricts the operation of the driving actuator 70, and an attachment base 22 to which the driving actuator 70 and the stopper actuator 80 are attached.

The driving actuator 70 includes a yoke 71 (first yoke) formed from a magnetic material, a coil 73 (first coil) wound around the yoke 71 and the attachment base 22, a rotor magnet 74 (first rotor magnet) rotatably attached to a shaft 17 (refer to FIG. 2) extending in the positive Z-direction from the base 10, and a driving lever 75 (first lever) connected to the rotor magnet 74. The yoke 71 in the present embodiment is thin and flat in Z-direction. The yoke 71 is U-shaped and includes two arms 71A and 71B. The coil 73 is wound around the arm 71B. The rotor magnet 74 is located between the arms 71A and 71B of the yoke 71. The rotor magnet 74 includes a magnet having different magnetic poles in the circumferential direction. The driving lever 75 includes a connecting part 76 extending in the positive Z-direction radially outside the rotor magnet 74.

The stopper actuator 80 includes a yoke 81 (second yoke) formed from a magnetic material, a coil 83 (second coil) wound around the yoke 81 and the attachment base 22, a rotor magnet 84 (second rotor magnet) rotatably attached to a shaft 18 (refer to FIG. 2) extending in the positive Z-direction from the base 10, and a stopper lever 85 (second lever) connected to the rotor magnet 84. The yoke 81 in the present embodiment is thin and flat in Z-direction. The yoke 81 is U-shaped and includes two arms 81A and 81B. The coil 83 is wound around the arm 81B. The rotor magnet 84 is located between the arms 81A and 81B of the yoke 81. The rotor magnet 84 includes a magnet having different magnetic poles in the circumferential direction. The stopper lever 85 includes a restrictor 86 extending in the positive Z-direction radially outside the rotor magnet 84.

As shown in FIG. 4, the attachment base 22 has a first housing space 23 housing the rotor magnet 74 and the driving lever 75 in the driving actuator 70 and a second housing space 24 housing the rotor magnet 84 and the stopper lever 85 in the stopper actuator 80. The attachment base 22 includes an arc-shaped window 25 to receive the connecting part 76 of the driving lever 75 in the driving actuator 70.

The attachment base 22 includes a support shaft 26 extending in the positive Z-direction. The support shaft 26 is received in a shaft hole 61 in the cam plate 60. With the support shaft 26 on the attachment base 22 received in the shaft hole 61 in the cam plate 60, the cam plate 60 is rotatable about the support shaft 26.

As shown in FIGS. 2 and 4, the attachment base 22 includes terminals 27 and 28 protruding in the positive Y-direction. The blade open-close device 1 includes a terminal plate 110 (first terminal plate) corresponding to the terminals 27 and a terminal plate 120 (second terminal plate) corresponding to the terminals 28. The terminal plates 110 and 120 are metal plates extending parallel to an XZ plane.

The ends of the coil 73 in the driving actuator 70 are wound around the terminals 27 on the attachment base 22. The ends of the coil 73 are fixed to the terminals 27 with, for example, solder joints 100 together with the terminal plate 110 as shown in FIG. 1. The terminal plate 110 includes connectors 110A at its end adjacent to the module board 2 (in the negative Z-direction). The connectors 110A are electrically connected to contacts on the module board 2 with solder joints (not shown). In this manner, the coil 73 in the driving actuator 70 is electrically connected to wiring (not shown) in the module board 2 with the terminal plate 110.

The ends of the coil 83 in the stopper actuator 80 are wound around the terminals 28 on the attachment base 22. The ends of the coil 83 are fixed to the terminals 28 with, for example, solder joints 101 together with the terminal plate 120 as shown in FIG. 1. The terminal plate 120 includes connectors 120A at its end adjacent to the module board 2 (in the negative Z-direction). The connectors 120A are electrically connected to contacts on the module board 2 with solder joints (not shown). In this manner, the coil 83 in the stopper actuator 80 is electrically connected to the wiring (not shown) in the module board 2 with the terminal plate 120.

In the present embodiment, the coil 73 in the driving actuator 70 and the coil 83 in the stopper actuator 80 are both wound around and held by the attachment base 22. The blade open-close device 1 with the single attachment base 22 holding both the coil 73 in the driving actuator 70 and the coil 83 in the stopper actuator 80 includes fewer components in total and thus is compact.

Figure 5:
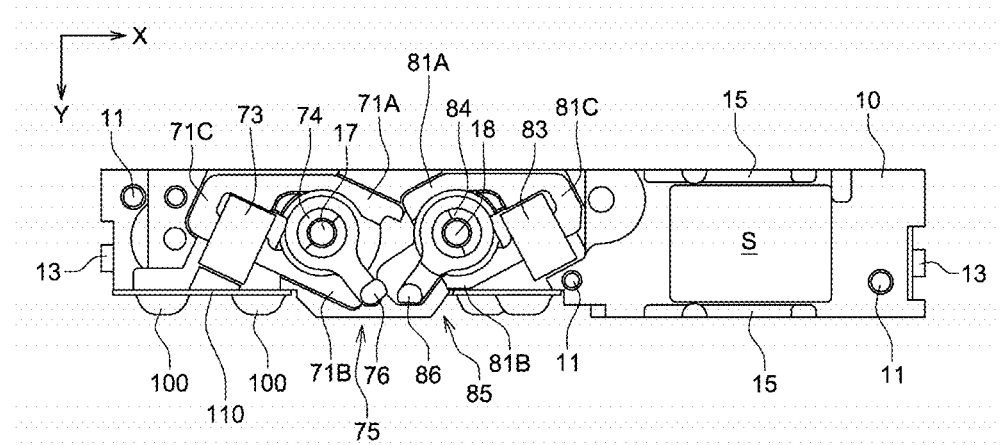
FIG. 5 is a plan view of a driving actuator and a stopper actuator attached to a base in the blade open-close device in FIG. 1.

FIG. 5 is a plan view of the driving actuator 70 and the stopper actuator 80 attached to the base 10. As shown in FIG. 5, the driving actuator 70 and the stopper actuator 80 face each other in X-direction. The two arms 71A and 71B of the yoke 71 in the driving actuator 70 branch from a base portion 71C. The arm 71A (first arm) extends from the base portion 71C generally in the positive X-direction. The arm 71B (second arm) extends from the base portion 71C generally obliquely in the positive Y-direction to X-direction. The coil 73 is wound around the arm 71B. Similarly, the two arms 81A and 81B of the yoke 81 in the stopper actuator 80 branch from a base portion 81C. The arm 81A (third arm) extends from the base portion 81C generally in the negative X-direction. The arm 81B (fourth arm) extends from the base portion 81C generally obliquely in the positive Y-direction to X-direction. The coil 83 is wound around the arm 81B. The arm 71A of the yoke 71 in the driving actuator 70 and the arm 81A of the yoke 81 in the stopper actuator 80 are adjacent to each other in X-direction.

This structure allows the driving actuator 70 and the stopper actuator 80 to fit efficiently in any limited space in Y-direction in the blade open-close device 1. The driving actuator 70 and the stopper actuator 80 fitted efficiently as above create a space in Y-direction for the terminal plates 110 and 120 extending parallel to the XZ plane. Thus, the blade open-close device 1 can have a smaller width in Y-direction.

Figure 6A:
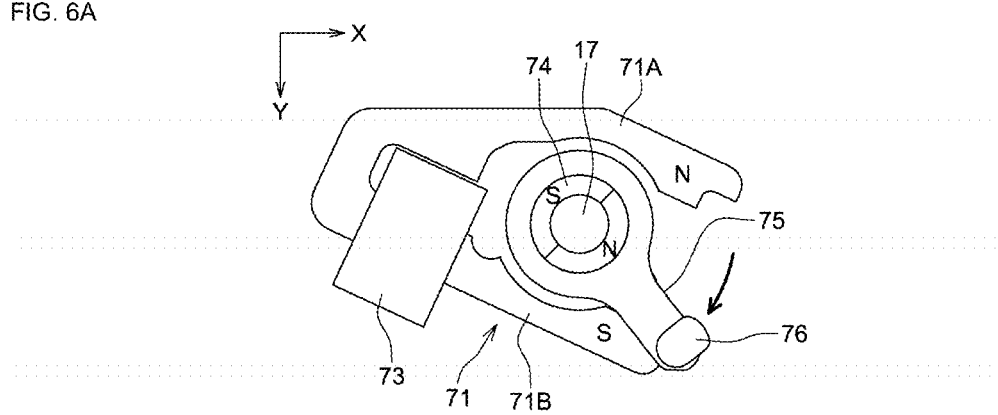
FIG. 6A is a schematic plan view of the driving actuator included in the actuator unit shown in FIG. 4, showing its example operation.
Figure 6B:
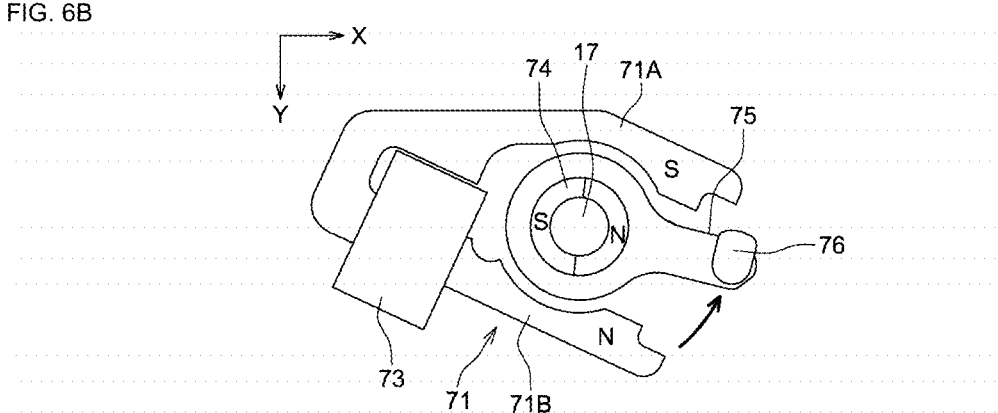
FIG. 6B is a schematic plan view of the driving actuator included in the actuator unit shown in FIG. 4, showing its example operation.

FIGS. 6A and 6B are schematic plan views of the driving actuator 70, each showing its example operation. In the driving actuator 70 in the present embodiment, when the coil 73 is energized with a current through the wiring in the module board 2, the arms 71A and 71B of the yoke 71 are magnetically polarized (magnetized) oppositely to each other. The magnetic forces of the arms 71A and 71B then attract and rotate the rotor magnet 74.

For example, when the coil 73 in the driving actuator 70 is energized with a current flowing in one direction, the arms 71A and 71B of the yoke 71 are magnetically polarized or magnetized as shown in FIG. 6A. The magnetic poles of the arms 71A and 71B of the yoke 71 attract the respective opposite magnetic poles of the rotor magnet 74, thus rotating the rotor magnet 74 clockwise. This rotates the driving lever 75 clockwise about the shaft 17 on the base 10.

When the coil 73 in the driving actuator 70 is energized with a current flowing in a direction opposite to the direction of the current in FIG. 6A, the arms 71A and 71B of the yoke 71 are magnetically polarized as shown in FIG. 6B. The magnetic poles of the arms 71A and 71B of the yoke 71 attract the respective opposite magnetic poles of the rotor magnet 74, thus rotating the rotor magnet 74 counterclockwise. This rotates the driving lever 75 counterclockwise about the shaft 17 on the base 10.

Referring back to FIG. 2, the cam plate 60 has a lever engagement hole 63 engaged with the connecting part 76 of the driving lever 75 in the driving actuator 70. The lever engagement hole 63 has a minimum width slightly larger than the outer diameter of the connecting part 76 of the driving lever 75 in the driving actuator 70. The connecting part 76 of the driving lever 75 in the driving actuator 70 is received in the lever engagement hole 63 in the cam plate 60. The connecting part 76 of the driving lever 75 is thus engaged with the lever engagement hole 63 in the cam plate 60. As the driving lever 75 rotates about the shaft 17 on the base 10 as described above, the cam plate 60 rotates about the support shaft 26 on the attachment base 22 in the actuator unit 20.

The blade 50 includes an engagement pin 51 extending in the negative Z-direction. The engagement pin 51 is engaged with a pin engagement hole 62 in the cam plate 60. The pin engagement hole 62 has a minimum width slightly larger than the outer diameter of the engagement pin 51 on the blade 50. The engagement pin 51 extending in the negative Z-direction from the blade 50 is placed through an opening 34 in the partition 30 and received in the pin engagement hole 62 in the cam plate 60. The engagement pin 51 on the blade 50 is thus engaged with the pin engagement hole 62 in the cam plate 60. As the cam plate 60 rotates about the support shaft 26 on the attachment base 22 in the actuator unit 20, the engagement pin 51 on the blade 50 moves while being engaged with the pin engagement hole 62 in the cam plate 60. The blade 50 moves in X-direction (opening and closing direction) as guided by the guides 15 on the base 10 as described above.

Figure 7A:
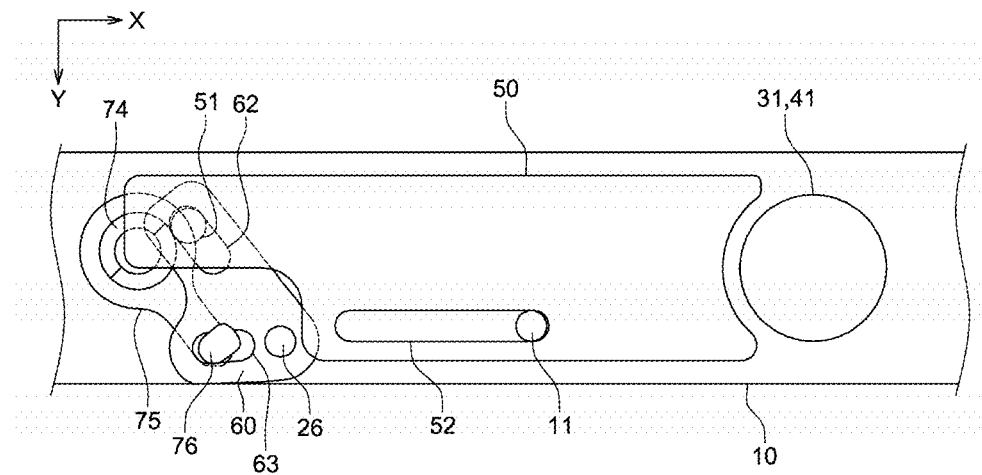
FIG. 7A is a schematic plan view of a blade at a position moved by the driving actuator shown in FIG. 6A.

FIG. 7A is a schematic plan view of the blade 50 at the position shown in FIG. 1. The blade 50 at this position does not cover the opening 31 in the partition 30 and the opening 41 in the cover plate 40, thus leaving the openings 31 and 41 uncovered. This allows external light to directly enter the lens in the lens unit 3 through the opening 31 in the partition 30 and the opening 41 in the cover plate 40, thus allowing image capturing with the lens unit 3. The position of the driving lever 75 in the driving actuator 70 and the position of the blade 50 shown in FIG. 7A each are hereafter referred to as an opening position.

Figure 7B:
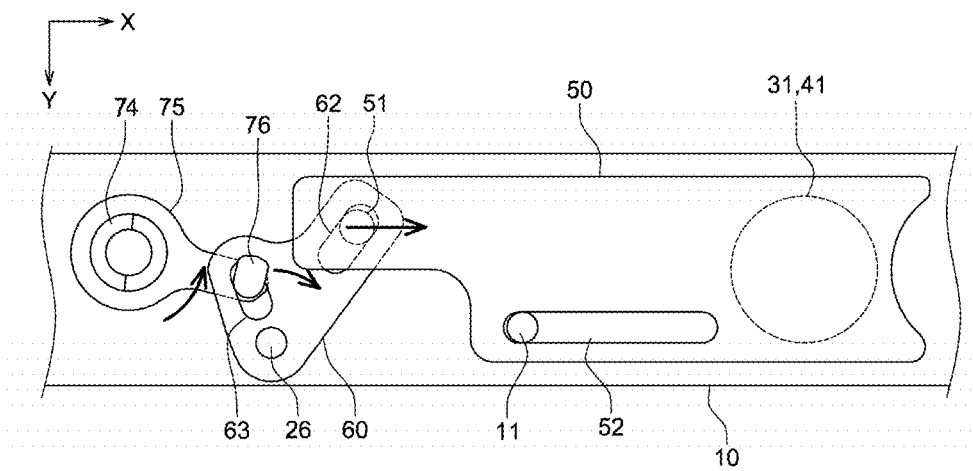
FIG. 7B is a schematic plan view of the blade at a position moved by the driving actuator shown in FIG. 6B.

When the coil 73 in the driving actuator 70 is energized in the state shown in FIG. 7A to rotate the rotor magnet 74 counterclockwise, the cam plate 60 with its lever engagement hole 63 engaged with the connecting part 76 of the driving lever 75 rotates clockwise about the support shaft 26 as shown in FIG. 7B. As the cam plate 60 rotates, the blade 50 with its engagement pin 51 engaged with the pin engagement hole 62 in the cam plate 60 moves in the positive X-direction as shown in FIG. 7B. The blade 50 moving in the positive X-direction covers the opening 31 in the partition 30 and the opening 41 in the cover plate 40. More specifically, the blade 50 at this position is aligned with the optical axis P of the lens unit 3, blocking light passing through the opening 41 in the cover plate 40. The position of the driving lever 75 in the driving actuator 70 and the position of the blade 50 shown in FIG. 7B each are hereafter referred to as a closing position.

The blade 50 formed from, for example, a material opaque to light to be captured by the lens unit 3 (e.g., visible light and infrared light) blocks light passing through the opening 41 in the cover plate 40 when the blade 50 is at the closing position shown in FIG. 7B, preventing the light from reaching the lens unit 3. In this state, the lens unit 3 in operation is not allowed to capture images or videos. This prevents images or videos unintended by the user from being obtained.

When the coil 73 in the driving actuator 70 is energized in the state shown in FIG. 7B to rotate the rotor magnet 74 clockwise, the cam plate 60 with its lever engagement hole 63 engaged with the connecting part 76 of the driving lever 75 rotates counterclockwise about the support shaft 26. The blade 50 with its engagement pin 51 engaged with the pin engagement hole 62 in the cam plate 60 then moves in the negative X-direction to the opening position shown in FIG. 7A.

In this manner, the driving actuator 70 in the actuator unit 20 rotates the driving lever 75 with power from the module board 2, thus allowing the blade 50 to move between the closing position and the opening position with the connecting part 76 of the driving lever 75 and the engagement pin 51 on the blade 50.

In the present embodiment, the yoke 71 is shaped to attract the rotor magnet 74 under the magnetic force from the rotor magnet 74 without any current supply to the coil 73 in the driving actuator 70. More specifically, when current supply to the coil 73 in the driving actuator 70 is stopped in the state shown in FIG. 6A, the rotor magnet 74 can remain at the position with its magnetic force acting on the yoke 71. The driving lever 75 can thus remain at the opening position. Similarly, when current supply to the coil 73 in the driving actuator 70 is stopped in the state shown in FIG. 6B, the rotor magnet 74 can remain at the position with its magnetic force acting on the yoke 71. The driving lever 75 can thus remain at the closing position.

In this manner, the yoke 71 can be shaped to prevent the blade 50 from unintentionally moving from the opening position or the closing position or from stopping between the opening position and the closing position without any current supply to the coil 73 in the driving actuator 70. The yoke 71 may be shaped to retain the driving lever 75 at the opening position alone or at the closing position alone. In particular, retaining the driving lever 75 at the closing position causes the blade 50 to cover the openings 41 and 31 without any current supply to the coil 73 in the driving actuator 70. This can prevent images or videos unintended by the user from being obtained.

The blade open-close device 1 according to the present embodiment includes a locking structure that can retain (lock) the blade 50 at the opening position and the closing position. The blade 50 locked at the opening position or the closing position by the locking structure is immovable in X-direction as described above. The locking structure includes the stopper actuator 80 in the actuator unit 20.

In the stopper actuator 80 in the present embodiment, when the coil 83 is energized with a current through the wiring in the module board 2, the arms 81A and 81B of the yoke 81 are magnetically polarized (magnetized) oppositely to each other. The magnetic forces of the arms 81A and 81B then attract and rotate the rotor magnet 84.

Figure 8A:
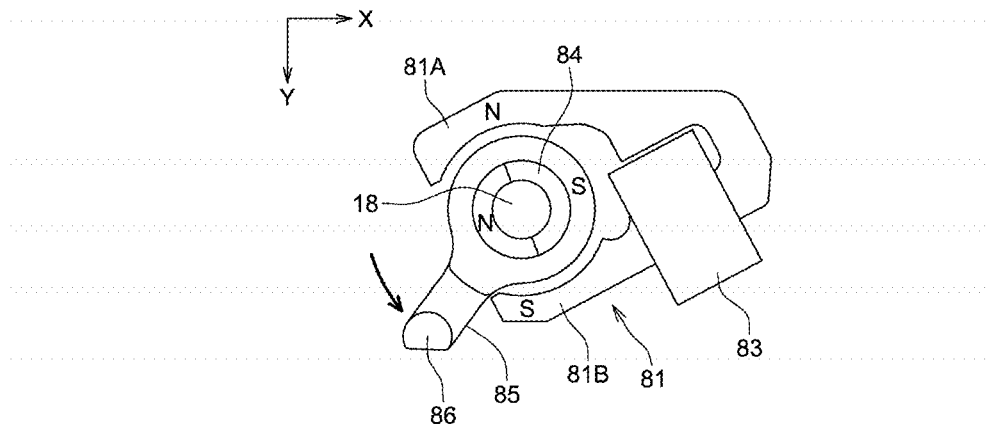
FIG. 8A is a schematic plan view of the stopper actuator included in the actuator unit shown in FIG. 4, showing its example operation.

For example, when the coil 83 in the stopper actuator 80 is energized with a current flowing in one direction, the arms 81A and 81B of the yoke 81 are magnetically polarized or magnetized as shown in FIG. 8A. The magnetic poles of the arms 81A and 81B of the yoke 81 attract the respective opposite magnetic poles of the rotor magnet 84, thus rotating the rotor magnet 84 counterclockwise. This rotates the stopper lever 85 counterclockwise about the shaft 18 on the base 10. In this state, the restrictor 86 in the stopper lever 85 is at a position at which the restrictor 86 is retracted from a path on which the driving lever 75 in the driving actuator 70 moves. The position of the stopper lever 85 in the stopper actuator 80 shown in FIG. 8A is hereafter referred to as an unlock position.

When the stopper lever 85 is at the unlock position, the restrictor 86 in the stopper lever 85 is located off the path of the driving lever 75 in the driving actuator 70. This allows the driving lever 75 in the driving actuator 70 to rotate without being interfered by the stopper lever 85, causing the blade 50 connected to the connecting part 76 of the driving lever 75 to be movable in X-direction. Thus, when the stopper lever 85 is at the unlock position, the driving actuator 70 can move the blade 50 from the opening position to the closing position or from the closing position to the opening position.

Figure 8B:
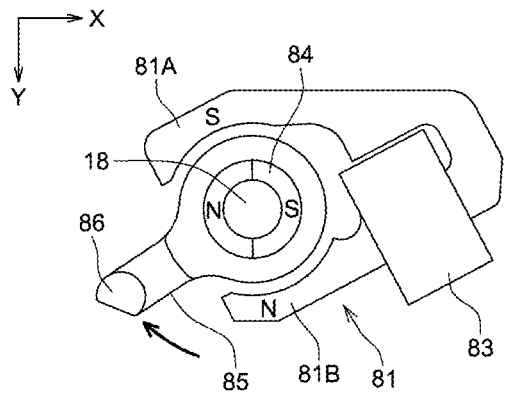
FIG. 8B is a schematic plan view of the stopper actuator included in the actuator unit shown in FIG. 4, showing its example operation.

When the coil 83 in the stopper actuator 80 is energized with a current flowing in a direction opposite to the direction of the current in FIG. 8A, the arms 81A and 81B of the yoke 81 are magnetically polarized as shown in FIG. 8B. The magnetic poles of the arms 81A and 81B of the yoke 81 attract the respective opposite magnetic poles of the rotor magnet 84, thus rotating the rotor magnet 84 clockwise. This rotates the stopper lever 85 clockwise about the shaft 18 on the base 10. In this state, the restrictor 86 in the stopper lever 85 is at a position at which the restrictor 86 is on the path on which the driving lever 75 in the driving actuator 70 moves. The position of the stopper lever 85 in the stopper actuator 80 shown in FIG. 8B is hereafter referred to as a lock position. When the stopper lever 85 is at the lock position, the restrictor 86 in the stopper lever 85 is on the path of the driving lever 75 in the driving actuator 70 and restricts the movement of the driving lever 75 in the driving actuator 70.

In this manner, the stopper actuator 80 in the actuator unit 20 rotates the stopper lever 85 with power from the module board 2, thus allowing the restrictor 86 in the stopper lever 85 to move between the position at which the restrictor 86 is retracted from the path of the driving lever 75 in the driving actuator 70 and the position at which the restrictor 86 is on the path.

In the present embodiment, the yoke 81 is shaped to attract the rotor magnet 84 under the magnetic force from the rotor magnet 84 without any current supply to the coil 83 in the stopper actuator 80. More specifically, when current supply to the coil 83 in the stopper actuator 80 is stopped in the state shown in FIG. 8A, the rotor magnet 84 can remain at the position with its magnetic force acting on the yoke 81. The stopper lever 85 can thus remain at the unlock position. Similarly, when current supply to the coil 83 in the stopper actuator 80 is stopped in the state shown in FIG. 8B, the rotor magnet 84 can remain at the position with its magnetic force acting on the yoke 81. The stopper lever 85 can thus remain at the lock position.

In this manner, the yoke 81 can be shaped to prevent the stopper lever 85 from unintentionally moving from the unlock position or the lock position or from stopping between the unlock position and the lock position without any current supply to the coil 83 in the stopper actuator 80. The yoke 81 may be shaped to retain the stopper lever 85 at the unlock position alone or at the lock position alone.

Figure 9A:
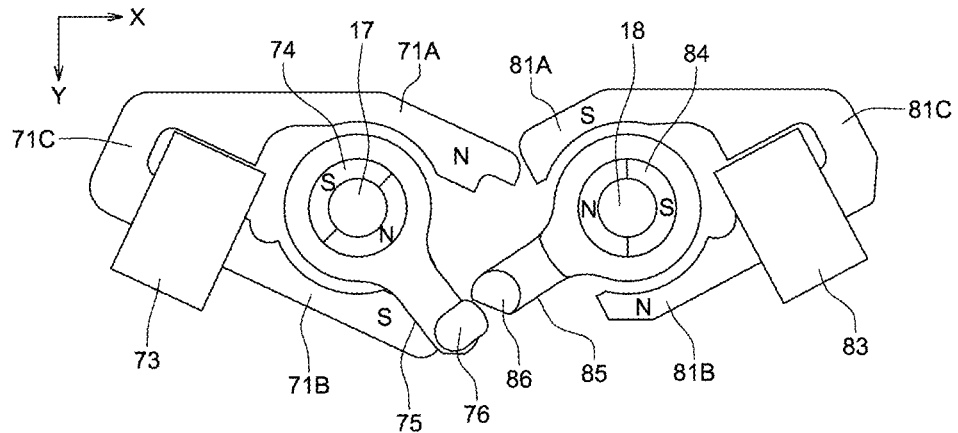
FIG. 9A is a schematic plan view of the actuator unit shown in FIG. 4, showing its example operation, with a driving lever in the driving actuator at an opening position and a stopper lever in the stopper actuator at a lock position.

FIG. 9A shows a positional relationship between the driving actuator 70 and the stopper actuator 80 with the blade 50 at the opening position. When the blade 50 is at the opening position, the driving lever 75 in the driving actuator 70 is at the opening position and the stopper lever 85 in the stopper actuator 80 is at the lock position. As described above, when the stopper lever 85 in the stopper actuator 80 is at the lock position, the restrictor 86 in the stopper lever 85 is located on the path of the driving lever 75 in the driving actuator 70. In this state, the restrictor 86 in the stopper lever 85 in the stopper actuator 80 restricts any movement or (counterclockwise) rotation of the driving lever 75 in the driving actuator 70 toward the closing position, restricting rotation of the driving lever 75 in the driving actuator 70 to the closing position. This also retains (locks) the blade 50 at the opening position.

Figure 9B:
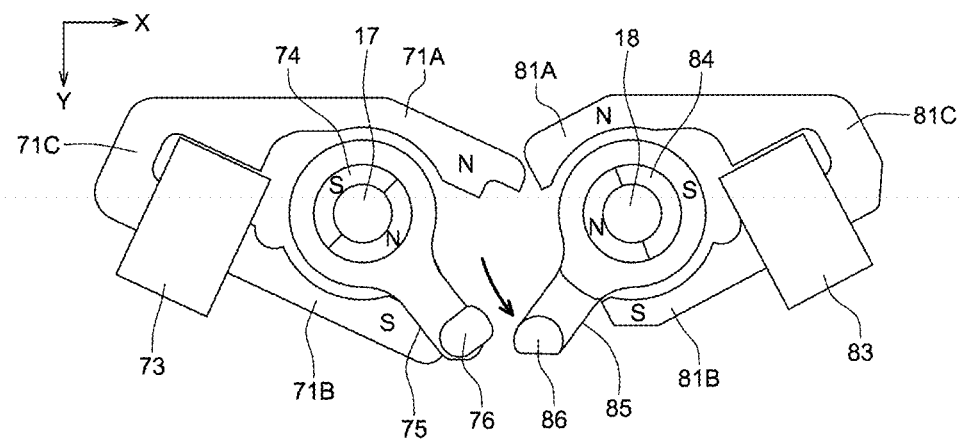
FIG. 9B is a schematic plan view of the actuator unit shown in FIG. 4, showing its example operation, with the driving lever in the driving actuator at the opening position and the stopper lever in the stopper actuator at an unlock position.

To move the blade 50 in the state shown in FIG. 9A to the closing position, the coil 83 in the stopper actuator 80 is energized with a current to rotate the stopper lever 85 counterclockwise to the unlock position as shown in FIG. 9B. This moves the restrictor 86 in the stopper lever 85 to the position at which the restrictor 86 is retracted from the path of the driving lever 75 in the driving actuator 70, allowing the driving lever 75 in the driving actuator 70 to rotate without being interfered by the stopper lever 85.

Figure 9C:
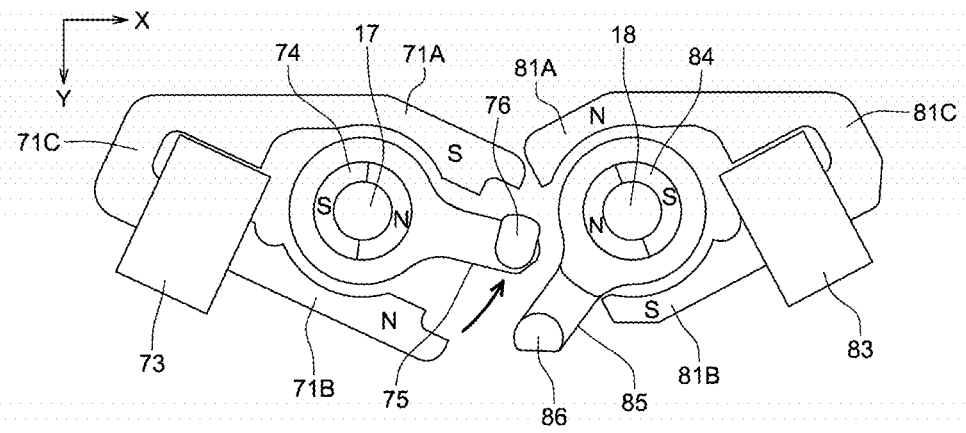
FIG. 9C is a schematic plan view of the actuator unit shown in FIG. 4, showing its example operation, with the driving lever in the driving actuator at a closing position and the stopper lever in the stopper actuator at the unlock position.

The coil 73 in the driving actuator 70 is then energized with a current to rotate the driving lever 75 counterclockwise to the closing position as shown in FIG. 9C. This moves the blade 50 to the closing position with the connecting part 76 of the driving lever 75 and the engagement pin 51 on the blade 50 (the state shown in FIG. 7B).

Figure 9D:
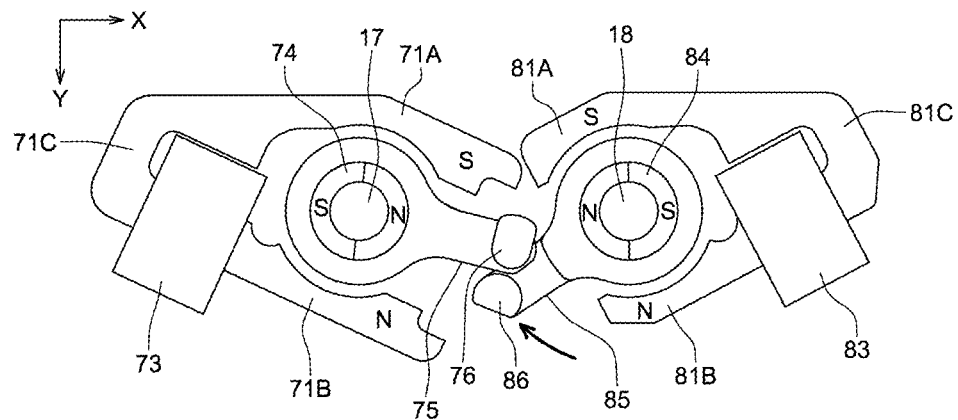
FIG. 9D is a schematic plan view of the actuator unit shown in FIG. 4, showing its example operation, with the driving lever in the driving actuator at the closing position and the stopper lever in the stopper actuator at the lock position.

After the blade 50 is moved to the closing position, the coil 83 in the stopper actuator 80 is re-energized with a current to rotate the stopper lever 85 clockwise to the lock position as shown in FIG. 9D. This moves the restrictor 86 in the stopper lever 85 in the stopper actuator 80 onto the path of the driving lever 75 in the driving actuator 70, restricting the movement of the driving lever 75 in the driving actuator 70. In this state, the restrictor 86 in the stopper lever 85 in the stopper actuator 80 restricts any (clockwise) rotation of the driving lever 75 in the driving actuator 70 toward the opening position. This retains (locks) the blade 50 connected to the connecting part 76 of the driving lever 75 in the driving actuator 70 at the closing position.

To move the blade 50 in the state shown in FIG. 9D to the opening position, the coil 83 in the stopper actuator 80 is energized with a current to rotate the stopper lever 85 counterclockwise to the unlock position (the state shown in FIG. 9C). This moves the restrictor 86 in the stopper lever 85 to the position at which the restrictor 86 is retracted from the path of the driving lever 75 in the driving actuator 70, allowing the driving lever 75 in the driving actuator 70 to rotate without being interfered by the stopper lever 85.

The coil 73 in the driving actuator 70 is then energized with a current to rotate the driving lever 75 in the driving actuator 70 clockwise to the opening position (the state shown in FIG. 9B). This moves the blade 50 to the opening position (the state shown in FIG. 7A) with the connecting part 76 of the driving lever 75 and the engagement pin 51 on the blade 50.

After the blade 50 is moved to the opening position, the coil 83 in the stopper actuator 80 is re-energized to rotate the stopper lever 85 clockwise to the lock position (the state shown in FIG. 9A). This moves the restrictor 86 in the stopper lever 85 in the stopper actuator 80 onto the path of the driving lever 75 in the driving actuator 70, restricting the movement of the driving lever 75 in the driving actuator 70. In this state, the restrictor 86 in the stopper lever 85 in the stopper actuator 80 restricts any (counterclockwise) rotation of the driving lever 75 in the driving actuator 70 toward the closing position. This retains (locks) the blade 50 connected to the connecting part 76 of the driving lever 75 in the driving actuator 70 at the opening position.

In the present embodiment, as described above, the stopper lever 85 in the stopper actuator 80 is moved to the lock position when the blade 50 is at the opening position or the closing position. The restrictor 86 in the stopper lever 85 in the stopper actuator 80 thus restricts the movement of the connecting part 76 of the driving lever 75 in the driving actuator 70, retaining the driving lever 75 in the driving actuator 70 at the opening position or the closing position. This retains (locks) the blade 50 at the opening position and the closing position. This prevents the blade 50 at the opening position and the closing position from unintentionally moving from the opening position or the closing position under external vibration or impact, thus reducing malfunctions of the blade open-close device 1. To move the blade 50 intentionally, the stopper lever 85 in the stopper actuator 80 is moved from the lock position to the unlock position to unlock the driving lever 75 in the driving actuator 70. This allows the driving actuator 70 to move the blade 50 between the opening position and the closing position.

The blade 50 may partially block light entering the lens unit 3 through the openings 41 and 31, rather than fully blocking light entering the lens unit 3. To partially block light entering the lens unit 3, for example, the blade 50 may be formed from a material having a low transmittance to light to be captured by the lens unit 3 (e.g., visible light and infrared light), may be colored, or may be patterned with irregularities or holes (e.g., a reticulated or grid pattern and a concentric circle pattern). This causes images or videos captured by the lens unit 3 to be partly unclear or invisible, thus preventing images or videos unintended by the user from being obtained.

In the present embodiment, the yoke 71 in the driving actuator 70 is shaped as described above, allowing the driving actuator 70 to retain the blade 50 in position. The blade open-close device 1 further including the above locking structure more reliably reduces unintentional movement of the blade 50.

The blade 50 may have a predetermined optical effect (e.g., a mosaic filter, scattering, and diffuse reflection) to light entering the lens unit 3 through the openings 41 and 31. The blade 50 also causes images or videos captured by the lens unit 3 to be partly unclear or invisible, thus preventing images or videos unintended by the user from being obtained.

At the closing position, the blade 50 has the outer surface exposed outside through the opening 41 in the cover plate 40. The blade 50 may have the outer surface colored with a highly visible color (e.g., red) or designed with, for example, a highly visible geometrical pattern (e.g., a star, a square, a polygon, or stripes), a logo, or an illustration. At the closing position, the blade 50 having the outer surface with a highly visible color or design is easily viewable by the user to allow the user to readily learn about the protection from unintended image or video capturing.

Although the opening 41 in the cover plate 40 and the opening 31 in the partition 30 are circular in the illustrated embodiment, the openings 41 and 31 may be of any shape such as rectangular and elliptical, rather than being circular.

Although the driving actuator 70 includes the flat U-shaped yoke 71 and the rotor magnet 74 in the above embodiment, the driving actuator to be used is not limited to this structure, and may have any structure that can move the blade 50 between the closing position and the opening position. Similarly, although the stopper actuator 80 includes the flat U-shaped yoke 81 and the rotor magnet 84 in the above embodiment, the stopper actuator to be used is not limited to this structure, and may have any structure that can restrict the operation of the driving actuator 70.

In the above embodiment, the stopper actuator 80 is activated to move the stopper lever 85 to the lock position both when the blade 50 is at the opening position and when the blade 50 is at the closing position. In some embodiments, the stopper lever 85 may be moved to the lock position either when the blade 50 is at the opening position or when the blade 50 is at the closing position. In this case, the stopper lever 85 may be moved to the lock position when the blade 50 is at the closing position to prevent images or videos unintended by the user from being captured with the lens unit 3.

Figure 10:
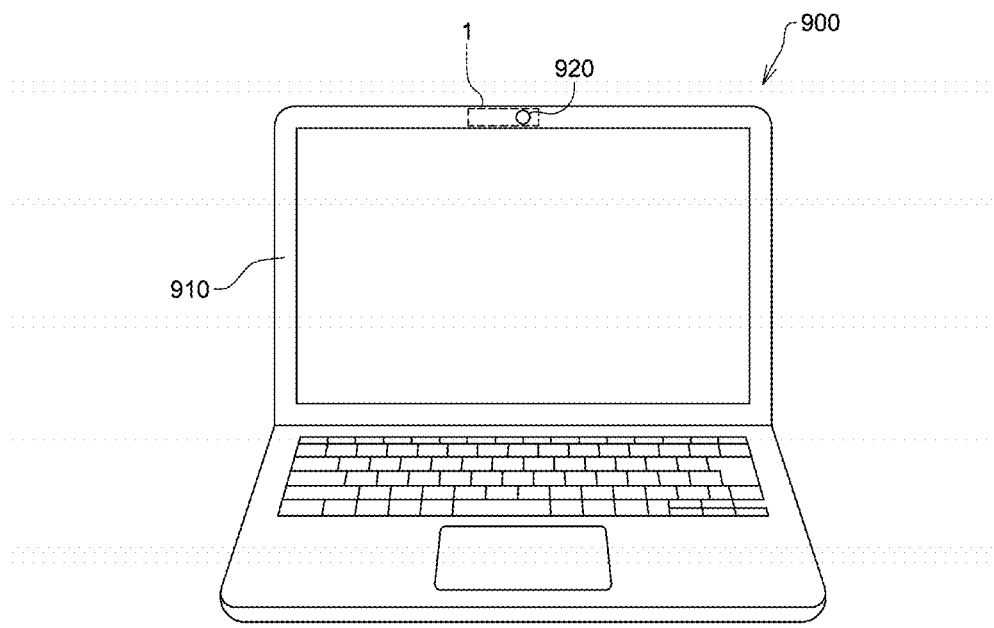
FIG. 10 is a schematic diagram of a laptop personal computer as an electronic device according to one embodiment of the present invention.

FIG. 10 is a diagram of a laptop personal computer 900 as an example electronic device incorporating the above blade open-close device 1. A display 910 of the laptop personal computer 900 has a window 920 for a camera. The blade open-close device 1 is incorporated in the laptop personal computer 900 with the lens unit 3 at a position corresponding to the window 920. This laptop personal computer 900 has the camera function.

Although the electronic device incorporating the blade open-close device 1 is the laptop personal computer 900 in the above example, the blade open-close device according to one or more embodiments of the present invention may be used in many electronic devices having the camera function, such as smart speakers and home security cameras, in addition to laptop personal computers.

For example, when an electronic device such as the laptop personal computer 900 is powered off or the display 910 of the laptop personal computer 900 is closed, the driving actuator 70 alone may retain the blade 50 in position. When the electronic device is powered on or the display 910 of the laptop personal computer 900 is open, the locking structure described above may be used to lock the blade 50 in position to avoid unintentional movement of the blade 50. In this manner, the locking structure in one or more embodiments of the present invention may be activated or may not be activated depending on the state of the electronic device incorporating the blade open-close device 1 or use of the device.

Although the embodiments of the present invention have been described above, the present invention is not limited to the above embodiments and may be modified variously within the scope of its technical idea.

As described above, a blade open-close device according to a first aspect of the present invention retains a blade at a predetermined position under an external load. The blade open-close device includes a base having a housing space housing a lens unit, a cover plate covering at least part of the base, and a blade located between the base and the cover plate. The cover plate has an opening aligned with an optical axis of the lens unit. The blade open-close device includes a driving actuator that moves the blade in an opening and closing direction perpendicular to the optical axis between a closing position to cover the opening and an opening position to uncover the opening, and a stopper actuator located adjacent to the driving actuator in the opening and closing direction to restrict an operation of the driving actuator. The driving actuator includes a first yoke, a first coil wound around part of the first yoke, a first rotor magnet rotatably located adjacent to the first yoke, and a first lever including a connecting part connected to the blade. The first lever is rotatable with the first rotor magnet to move the blade. The stopper actuator includes a second yoke, a second coil wound around part of the second yoke, a second rotor magnet rotatably located adjacent to the second yoke, and a second lever rotatable with the second rotor magnet. The second lever includes a restrictor movable onto a path on which the first lever in the driving actuator is movable.

In this structure, when the blade is at the opening position and/or the blade is at the closing position, the restrictor in the second lever in the stopper actuator is moved onto the path of the first lever in the driving actuator to restrict the movement of the first lever in the driving actuator. This retains (locks) the blade at the opening position and/or the closing position. This prevents the blade at the opening position and/or the closing position from unintentionally moving from the opening position and/or the closing position under external vibration or impact, thus reducing malfunctions of the blade open-close device. To move the blade intentionally, the restrictor in the second lever in the stopper actuator is retracted from the path of the first lever in the driving actuator to allow the first lever in the driving actuator to move. This allows the driving actuator to move the blade between the opening position and the closing position.

The driving actuator and the stopper actuator may face each other in the opening and closing direction. In this case, the first yoke in the driving actuator may include a first arm extending generally in the opening and closing direction and a second arm extending generally obliquely to the opening and closing direction. The second yoke in the stopper actuator may include a third arm extending generally in the opening and closing direction and located adjacent to the first arm of the first yoke in the opening and closing direction, and a fourth arm extending generally obliquely to the opening and closing direction. The first coil in the driving actuator may be wound around the second arm of the first yoke. The second coil in the stopper actuator may be wound around the fourth arm of the second yoke. This structure allows the driving actuator and the stopper actuator to fit efficiently in any limited space in a direction perpendicular to the opening and closing direction in a blade open-close device.

The blade open-close device may further include a first terminal plate to energize the first coil in the driving actuator and a second terminal plate to energize the second coil in the stopper actuator. The first terminal plate extends in the opening and closing direction and in a direction along the optical axis. The second terminal plate extends in the opening and closing direction and in the direction along the optical axis. The blade open-close device with the terminal plates extending in the opening and closing direction and in the direction along the optical axis has a smaller width in a direction perpendicular to the two directions and thus is compact.

The blade open-close device may further include an attachment base holding the first coil in the driving actuator and the second coil in the stopper actuator. The device with the single attachment base holding the first coil in the driving actuator and the second coil in the stopper actuator includes fewer components in total and thus is compact.

An electronic device according to a second aspect of the present invention includes the blade open-close device described above.

What is claimed is:

1. A blade open-close device, comprising:
   a base having a housing space housing a lens unit;

a cover plate covering at least part of the base and having an opening aligned with an optical axis of the lens unit;
a blade located between the base and the cover plate;
a driving actuator configured to move the blade in an opening and closing direction perpendicular to the optical axis between a closing position to cover the opening and an opening position to uncover the opening; and
a stopper actuator located adjacent to the driving actuator in the opening and closing direction to restrict an operation of the driving actuator,
wherein the driving actuator includes
a first yoke,
a first coil wound around part of the first yoke,
a first rotor magnet rotatably located adjacent to the first yoke, and
a first lever including a connecting part connected to the blade, the first lever being rotatable with the first rotor magnet to move the blade, and
the stopper actuator includes
a second yoke,
a second coil wound around part of the second yoke,
a second rotor magnet rotatably located adjacent to the second yoke, and
a second lever rotatable with the second rotor magnet and including a restrictor movable onto a path on which the first lever in the driving actuator is movable, wherein the second lever is configured to bring the restrictor into contact with the connecting part in both the closing position and the opening position.

2. The blade open-close device according to claim 1, wherein
the driving actuator and the stopper actuator face each other in the opening and closing direction,
the first yoke in the driving actuator includes
a first arm (1) extending in the opening and closing direction or (2) extending in the opening and closing direction and subsequently extending obliquely toward a direction perpendicular to the opening and closing direction, and
a second arm extending obliquely toward the direction perpendicular to the opening and closing direction, and
the second yoke in the stopper actuator includes
a third arm (1) extending in the opening and closing direction or (2) extending in the opening and closing direction and subsequently extending obliquely toward the direction perpendicular to the opening and closing direction, and the third arm being located adjacent to the first arm of the first yoke in the opening and closing direction, and
a fourth arm extending obliquely toward the direction perpendicular to the opening and closing direction.

3. The blade open-close device according to claim 2, wherein
the first coil in the driving actuator is wound around the second arm of the first yoke, and
the second coil in the stopper actuator is wound around the fourth arm of the second yoke.

4. The blade open-close device according to claim 1, further comprising:
a first terminal plate configured to energize the first coil in the driving actuator, the first terminal plate extending in the opening and closing direction and in a direction along the optical axis; and
a second terminal plate configured to energize the second coil in the stopper actuator, the second terminal plate extending in the opening and closing direction and in the direction along the optical axis.

5. The blade open-close device according to claim 1, further comprising:
an attachment base holding the first coil in the driving actuator and the second coil in the stopper actuator.

6. An electronic device, comprising:
the blade open-close device according to claim 1.

7. The blade open-close device according to claim 1, wherein
the driving actuator and the stopper actuator face each other in the opening and closing direction,
the first yoke in the driving actuator includes:
a first arm comprising a first portion extending in the opening and closing direction, and a second portion extending obliquely to the opening and closing direction, and
a second arm comprising a third portion extending obliquely to the opening and closing direction, and
the second yoke in the stopper actuator includes:
a third arm comprising a forth portion extending in the opening and closing direction, and a fifth portion extending obliquely to the opening and closing direction, wherein the third arm is located adjacent to the first arm of the first yoke in the opening and closing direction, and
a fourth arm comprising a sixth portion extending obliquely to the opening and closing direction.

\* \* \* \* \*